(12) United States Patent
Guillot et al.

(10) Patent No.: US 12,466,578 B2
(45) Date of Patent: Nov. 11, 2025

(54) IMPACT DETECTION DEVICE, ASSOCIATED DETECTION SYSTEM AND AIRCRAFT EQUIPPED WITH SUCH A SYSTEM

(71) Applicants: SAFRAN ELECTRICAL & POWER, Blagnac (FR); SAFRAN ELECTRONICS & DEFENSE, Boulogne-Billancourt (FR)

(72) Inventors: François Guillot, Moissy-Cramayel (FR); Serge Thierry Roques, Moissy-Cramayel (FR); Nicolas Fanton, Moissy-Cramayel (FR)

(73) Assignees: SAFRAN ELECTRICAL & POWER, Blagnac (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 234 days.

(21) Appl. No.: 17/779,935

(22) PCT Filed: Dec. 8, 2020

(86) PCT No.: PCT/FR2020/052334
§ 371 (c)(1),
(2) Date: May 25, 2022

(87) PCT Pub. No.: WO2021/116590
PCT Pub. Date: Jun. 17, 2021

(65) Prior Publication Data
US 2022/0411095 A1   Dec. 29, 2022

(30) Foreign Application Priority Data
Dec. 11, 2019 (FR) ...................... 1914176

(51) Int. Cl.
*B64D 45/00* (2006.01)

(52) U.S. Cl.
CPC ........ *B64D 45/00* (2013.01); *B64D 2045/008* (2013.01); *B64D 2045/0085* (2013.01)

(58) Field of Classification Search
CPC ... B64D 45/00; B64D 2045/0085; B64F 5/60; H02J 50/20; H02J 2310/44; H02J 7/34;
(Continued)

(56) References Cited

U.S. PATENT DOCUMENTS

| | | |
|---|---|---|
| 6,748,791 B1 | 6/2004 | Georgeson et al. |
| 8,886,388 B2 | 11/2014 | Moser et al. |

(Continued)

FOREIGN PATENT DOCUMENTS

| | | |
|---|---|---|
| EP | 2 081 156 A2 | 7/2009 |
| FR | 3 073 500 A1 | 5/2019 |

(Continued)

OTHER PUBLICATIONS

Machine translation of WO-2009087164-A1 (Year: 2009).*
International Search Report as issued in International Patent Application No. PCT/FR2020/052334, dated Mar. 29, 2021.

*Primary Examiner* — Navid Z. Mehdizadeh
*Assistant Examiner* — Caitlin R McCleary
(74) *Attorney, Agent, or Firm* — Pillsbury Winthrop Shaw Pittman LLP (57) ABSTRACT

An impact detection device includes an impact detector, a wireless communication device, an energy storage device, an autonomous electrical energy generation device, a device for receiving energy by radio frequency, the device being configured to adopt the following two modes: a first mode, referred to as autonomous mode, in which the autonomous electrical energy generation device is configured to supply the impact detector and the wireless communication device; a second mode, referred to as external mode, in which the device for receiving energy by radio frequency is configured (Continued)

to supply the impact detector and the wireless communication device.

12 Claims, 6 Drawing Sheets

(58) Field of Classification Search
CPC ......... H02J 1/084; H10N 10/17; H10N 10/10; G08C 17/02; G01L 5/0052
See application file for complete search history.

(56) References Cited

U.S. PATENT DOCUMENTS

| | | |
|---|---|---|
| 2007/0095160 A1* | 5/2007 | Georgeson ......... G01N 29/0645 73/866 |
| 2010/0024590 A1* | 2/2010 | O'Neill ................ G01L 3/242 702/41 |
| 2011/0162451 A1 | 7/2011 | Petelenz et al. |
| 2012/0283968 A1* | 11/2012 | Katsuki ................ H01M 10/44 307/64 |
| 2014/0165728 A1* | 6/2014 | Chaume ............. G01N 29/2481 73/584 |
| 2017/0345230 A1* | 11/2017 | Bill ....................... H04L 9/3271 |
| 2019/0061533 A1* | 2/2019 | Wang ..................... B60L 53/12 |
| 2019/0148978 A1* | 5/2019 | Chang .................... H04B 5/79 320/108 |

FOREIGN PATENT DOCUMENTS

| | | | |
|---|---|---|---|
| WO | WO-2009087164 A1 * | 7/2009 | ............. B64D 45/04 |
| WO | WO 2011/109533 A2 | 9/2011 | |
| WO | WO 2019/090426 A1 | 5/2019 | |

* cited by examiner

------ Data
——— Energy

[Fig. 4]

------ Data
——— Energy

IMPACT DETECTION DEVICE, ASSOCIATED DETECTION SYSTEM AND AIRCRAFT EQUIPPED WITH SUCH A SYSTEM

CROSS-REFERENCE TO RELATED APPLICATIONS

This application is the U.S. National Stage of PCT/FR2020/052334, filed Dec. 8, 2020, which in turn claims priority to French patent application number 1914176 filed Dec. 11, 2019. The content of these applications are incorporated herein by reference in their entirety.

TECHNICAL FIELD OF THE INVENTION

The technical field of the invention is that of the detection of impacts.

The present invention relates to an impact detection device and in particular an impact detection device configured to operate according to different modes as a function of the conditions of use. The invention also relates to a detection system comprising a plurality of detection devices according to the invention and an aircraft equipped with such a system.

TECHNOLOGICAL BACKGROUND OF THE INVENTION

In a known manner, an aircraft comprises a fuselage made of composite material, generally comprising carbon fibres with a thermoplastic matrix, in order to benefit from high mechanical strength for low mass compared to a fuselage made of traditional metal material. When an aircraft is parked in an airport, vehicles circulating in the airport (tractors, trucks, etc.) are liable to enter into contact with the aircraft, which damages its composite material fuselage. Such damage reduces the mechanical strength of the composite material and thus has to be detected. In practice, to detect damage linked to an impact, the outer surface of an aircraft is visually inspected by operators, which is long and costly given the fact that the aircraft has to be immobilised. Visual detection of damage linked to an impact is difficult because damage of the composite material is generally internal and not very visible from the exterior. In order to overcome this drawback, it has been proposed in the U.S. Pat. No. 6,748,791B1 to use an inspection hammer equipped with an accelerometer which makes it possible to qualify the type of damage received by the fuselage. Such an inspection hammer can only be used when the damaged zone has been identified beforehand visually. Consequently, this solution has the same drawbacks as those cited previously.

It has also been proposed by the U.S. Pat. No. 8,886,388B2 to integrate electrical wires in the composite material fuselage in order to form current loops. When the fuselage is damaged, one or more electrical wires break, which severs the current loop and leads to the emission of an alarm. Such a solution is advantageous because it makes it possible to locate a zone already visible from the outside since it has led to the rupture of one or more wires. However, in practice, this solution is complex to implement for an aircraft. Indeed, the electrical wires have to be integrated when the fuselage is manufactured, which is costly to do and difficult to maintain. Finally, this solution imposes providing a specific electrical network, which further increases cost and complexity.

A detection system comprising a plurality of detection members and a plurality of communication members configured to communicate with the detection members has also been proposed by the application FR 3 073 500. Energy is supplied to the detection members by means of an RF signal which enables a relatively flexible installation of the detection members. However, the transmission of RF signals is not always compatible with the operational phase of an aircraft, in particular when said aircraft is in flight or instead when said aircraft is stored for several days, without electrical supply. During these periods, the detection system is no longer functional and thus cannot take account of the occurrence of an impact.

Consequently, there thus exists a need for a detection device enabling great flexibility of installation while guaranteeing a detection of impacts without interruption. There also exists a need for a detection system making it possible to monitor continuously the possible occurrence of impacts, in particular at the level of the fuselage of an aircraft.

SUMMARY OF THE INVENTION

The invention offers a solution to the aforementioned problems, by proposing a detection device configured to operate according to different operating modes and thus to ensure permanently the detection of any impacts.

A first aspect of the invention relates to an impact detection device comprising an impact detector, a wireless communication means, an energy storage means, an autonomous electrical energy generation means, a means for receiving energy by radio frequency, the device being configured to adopt the following two modes, preferably mutually exclusive:
- a first mode, referred to as autonomous mode, in which the autonomous electrical energy generation means is configured to supply the impact detector and the wireless communication means;
- a second mode, referred to as external mode, in which the means for receiving energy by radio frequency is configured to supply the impact detector and the wireless communication means.

Thanks to the invention, the detection device can adapt its operating mode to the available energy sources. For example, if the device is arranged in an aircraft, the autonomous mode will be particularly suited to the flight phase of the aircraft whereas the external mode will be particularly suited to the ground phase of the aircraft during which radio frequency signals may be used to supply the device with energy. Thus, the device will be able to communicate the data acquired by the impact detector during these two phases.

Apart from the characteristics that have been mentioned in the preceding paragraph, the system according to a first aspect of the invention may have one or more complementary characteristics among the following, considered individually or according to all technically possible combinations thereof.

Advantageously, the device according to a first aspect of the invention comprises an energy storage means, the device being configured to alternate between the autonomous mode, the external mode and a third mode, referred to as transition mode, in which the storage means is configured to supply, without external energy input, the impact detector and the wireless communication means. Preferably, these three modes are mutually exclusive.

Thus, the storage means make it possible to ensure the transition between the autonomous mode and the external mode when the external conditions do not lend themselves to either of these two modes.

Advantageously, when the device is in external mode, the means for receiving energy by radio frequency is configured to supply the impact detector and the wireless communication means through the storage means.

Advantageously, when the device is in autonomous mode, the autonomous electrical energy generation means is configured to supply the impact detector and the wireless communication means through the storage means.

Advantageously, the autonomous electrical energy generation means comprise a Seebeck module and/or a piezoelectric module.

Thus, the device according to the invention can draw advantage from a temperature gradient and/or vibrations in order to generate the electrical energy required for its operation when it is in autonomous mode.

Advantageously, the wireless communication means is configured to operate as means for receiving energy by radio frequency when the device is in external mode.

Thus, the same module is used for the communication and for the reception of energy by radio frequency, which makes it possible to simplify the device according to the invention.

A second aspect of the invention relates to a system for detecting impacts on a structure, the detection system comprising:
  a plurality of detection devices according to a first aspect of the invention positioned on a surface of the structure, each detection device being associated with an identifier relating to a predetermined zone of the structure;
  a plurality of communication devices close to the structure and configured to communicate with the detection devices of the plurality of detection devices so as to collect the measurements made by said devices and to associate them with the identifier of the corresponding device.

Apart from the characteristics that have been mentioned in the preceding paragraph, the system according to a second aspect of the invention may have one or more complementary characteristics among the following, considered individually or according to all technically possible combinations thereof.

Advantageously, the plurality of communication devices are configured to send an instruction to the detection devices of the plurality of detection devices to adopt a mode among the autonomous mode, the transition mode or the external mode.

Advantageously, each communication device comprises an energy storage means and/or a memory.

A third aspect of the invention relates to an aircraft comprising a fuselage and an impact detection system according to a second aspect of the invention configured to detect impacts on the fuselage, the detection devices of the impact detection system being arranged on the inner surface of the fuselage and the plurality of communication devices of the impact detection system being arranged in the aircraft.

Thus, the aircraft according to the invention has at its disposal a detection system available permanently and not only during ground phases.

Thus, it is possible to choose the operating mode of the detection devices in a centralised manner.

The invention and the different applications thereof will be better understood on reading the description that follows and by examining the figures that accompany it.

DETAILED DESCRIPTION

The figures are presented for indicative purposes and in no way limit the invention. Unless stated otherwise, a same element appearing in the different figures has a single reference.

Figure 1:
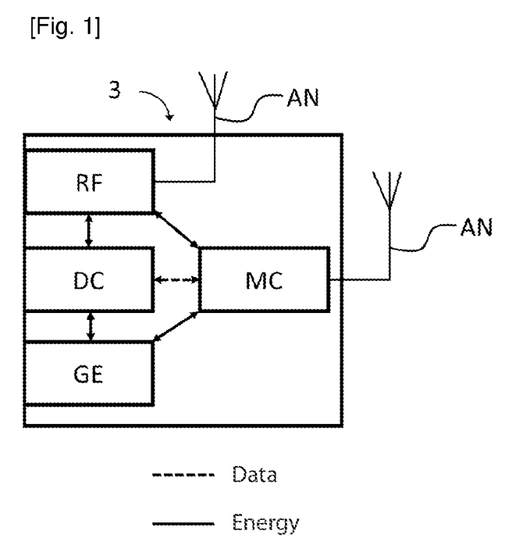
FIG. 1 shows a schematic representation of a first embodiment of a device according to a first aspect of the invention.

A first aspect of the invention illustrated in FIG. 1 relates to an impact detection device 3.

The device 3 according to a first aspect of the invention comprises at least one impact detector DC. The impact detector DC may for example comprise an accelerometer or instead a piezoelectric sensor. In one embodiment, the device 3 comprises a plurality of impact detectors DC, the nature of the detectors DC of the plurality of detectors DC being able to be identical or different. Thus, it is possible to put in place a system of redundancy of measurements in order to ensure the exactitude thereof, by choosing for example detectors of same nature. It is also possible to choose detectors of different nature, each type of detector being able to be sensitive to different signals.

The device 3 according to a first aspect of the invention also comprises at least one wireless communication means MC provided with an antenna AN1, for example an RFID type communication means, a 4G communication means, a Wifi communication means or instead a WAIC (Wireless Avionics Intra-Communications) communication means. The wireless communication means MC make it possible to transmit the data measured by the impact detector or detectors DC rapidly, which presents a certain advantage when the collection of data must be done regularly and/or on a large number of devices 3 according to a first aspect of the invention. This further guarantees a freedom of implantation of the detection device 3 according to the invention since the latter does not require any physical connection to transmit the measured data. In one embodiment, the wireless communication means MC also make it possible to receive instructions, for example to indicate to the device 3 the operating mode to adopt among the operating modes that will be detailed hereafter.

Figure 4:
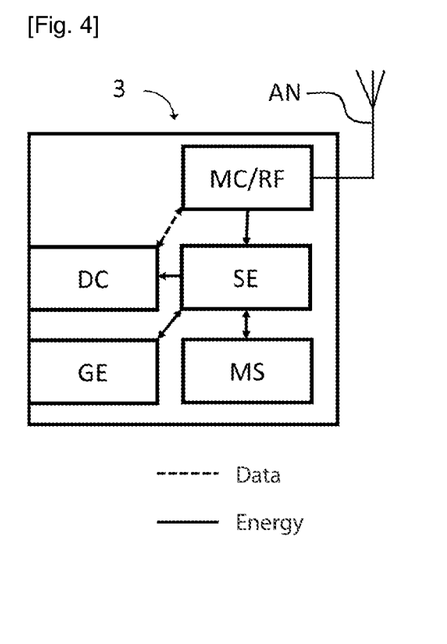
FIG. 4 shows a schematic representation of a fourth embodiment of a device according to a first aspect of the invention.
Figure 5:
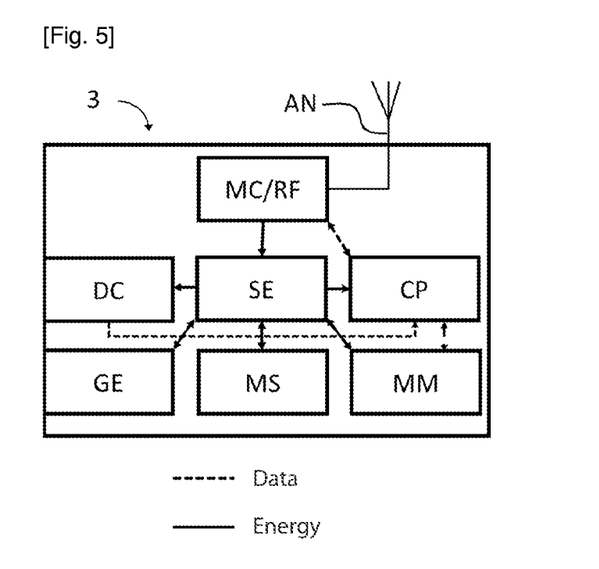
FIG. 5 shows a schematic representation of a fifth embodiment of a device according to a first aspect of the invention.

The device 3 according to a first aspect of the invention further comprises an autonomous electrical energy generation means GE and a means for receiving energy by radio frequency RF provided with an antenna AN2. The autonomous electrical energy generation means GE and the means for receiving energy by radio frequency RF make it possible to supply with electrical energy the impact detector DC and, if needs be, an energy storage means MS (as illustrated in FIG. 2), an energy supervisor SE (as illustrated in FIG. 4), a memory MM and/or a computing means CP (as illustrated in FIG. 5).

In addition, the device 3 according to a first aspect of the invention is configured to adopt the following two modes: a first mode, referred to as autonomous mode, and a second mode, referred to as external mode, the two modes preferably being mutually exclusive. When the device 3 according to a first aspect of the invention is in the autonomous mode, the autonomous electrical energy generation means GE are configured to supply the impact detector DC and the wireless communication means MC. When the device 3 according to a first aspect of the invention is in the external mode, the means for receiving energy by radio frequency RF are configured to supply the impact detector DC and the wireless communication means MC.

Thus, the device 3 can adapt its operating mode to the available energy sources. For example, if the device 3 according to a first aspect of the invention is arranged in an aircraft as will be described hereafter, the autonomous mode will be particularly suited to the flight phase of the aircraft whereas the external mode will be particularly suited to the ground phase of the aircraft during which RF signals may be used to supply the device 3 with energy. Thus, the device 3 according to a first aspect of the invention will be able to communicate the data acquired by the impact detector during these two phases.

Figure 2:
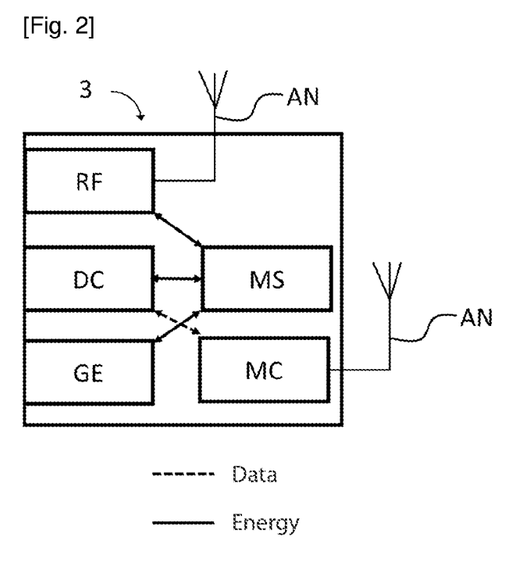
FIG. 2 shows a schematic representation of a second embodiment of a device according to a first aspect of the invention.

In one embodiment illustrated in FIG. 2, the device 3 also comprises at least one energy storage means MS and the device 3 is configured to alternate between the autonomous mode, the external mode and a third mode, referred to as transition mode, the three modes preferably being mutually exclusive. In addition, when the device 3 according to a first aspect of the invention is in the transition mode, the storage means MS are configured to supply, without external energy input (for example, coming from the autonomous electrical energy generation means GE or the means for receiving energy by radio frequency RF), the impact detector DC and the wireless communication means MC. In one embodiment, the storage means MS comprise a battery, a capacitor and/or a supercapacitor In one embodiment, when the device 3 is in autonomous mode, the autonomous electrical energy generation means GE are configured to supply the impact detector DC and the wireless communication means MC through the storage means MS. In one embodiment, when the device 3 is in RF mode, the means for receiving energy by radio frequency RF are configured to supply the impact detector DC and the wireless communication means MC through the storage means MS.

Figure 3:
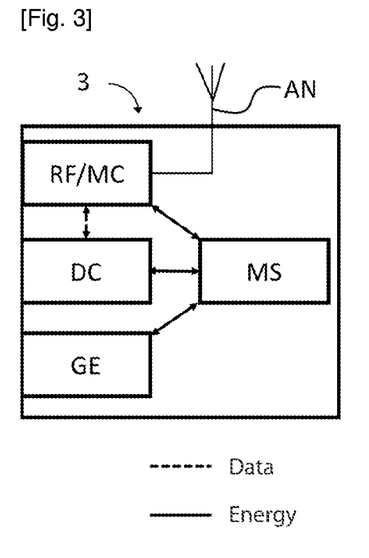
FIG. 3 shows a schematic representation of a third embodiment of a device according to a first aspect of the invention.

In one embodiment illustrated in FIG. 3, when the device 3 according to a first aspect of the invention is in RF mode, the wireless communication means MC/RF are configured to operate as means for receiving energy by radio frequency. In other words, the same module MC/RF is used to ensure the wireless communication MC and reception of energy by radio frequency RF functions, which notably makes it possible to simplify the device 3, for example by reducing the number of antenna AN required.

In one embodiment illustrated in FIG. 4, the device 1 according to a first aspect of the invention comprises an energy supervisor SE configured to choose, among the different operating modes, the most suitable operating mode or modes. In one embodiment, the choice of the operating mode is made on an instruction received through the wireless connection means MC. In one embodiment, the choice of the operating mode is a function of the electrical energy capable of being supplied by the autonomous electrical energy generation means GE and the means for receiving energy by radio frequency RF.

In one embodiment illustrated in FIG. 5, the device 3 according to a first aspect of the invention comprises a memory MM configured to store the measurements made by the impact detector or detectors DC. Thus, the measurements made by the device 3 are not necessarily transmitted immediately, but only at regular intervals. In this embodiment, the device according to a first aspect of the invention also comprises a computing means CP coupled to the memory, said computing means CP being configured to perform a pre-processing or a processing of the data acquired by the impact detector or detectors DC. For example, the pre-processing or the processing will be able to comprise the selection of the acquired data that have to be memorised and/or transmitted by the wireless communication means MC.

Figure 6:
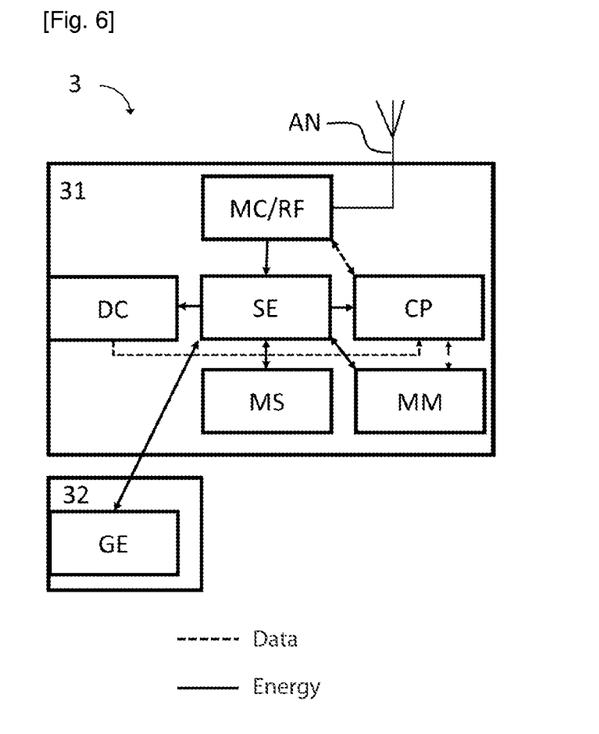
FIG. 6 shows a schematic representation of a sixth embodiment of a device according to a first aspect of the invention.

In one embodiment illustrated in FIG. 6, the device 3 according to a first aspect of the invention comprises a first set 31, for example in the form of a first housing, comprising the impact detector or detectors DC, and a second set 32, for example in the form of a second housing, comprising the autonomous electrical generation means GE, the first set 31 and the second set 32 being connected so that the energy generated by the autonomous electrical generation means GE at the level of the second set 32 can be transmitted to the first set 31. Thus, it is possible to displace the generation means when the most suited location for the detection of impacts and the most suited location for the generation of energy by the autonomous electrical generation means GE are not identical.

Figure 7:
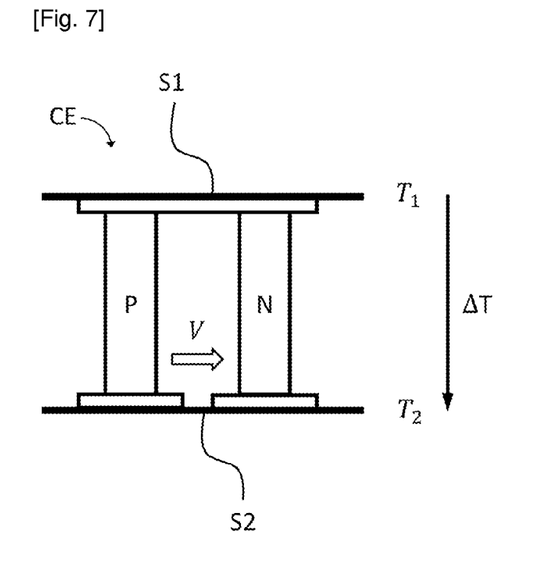
FIG. 7 shows a schematic representation of the structure of a Seebeck cell.

In one embodiment, the autonomous electrical energy generation means GE comprise at least one Seebeck module SK. Generally speaking, a Seebeck module SK comprises one or more Seebeck cells CE such as illustrated in FIG. 7 and comprising a first surface S1 intended to be exposed to a first temperature $T_1$ and a second surface S2 intended to be exposed to a second temperature $T_2$. The temperature gradient $\Delta T$ applied to the Seebeck module SK is equal to the difference between the temperature $T_2$ to which the second surface S2 of the Seebeck cell CE is exposed and the temperature $T_1$ to which the first surface S1 of the Seebeck cell CE is exposed such that $\Delta T = T_2 - T_1$. The presence of this temperature gradient $\Delta T$ leads to the appearance of a voltage V at the terminals of the Seebeck cell CE, the sign of this voltage V being a function of the sign of the gradient $\Delta T$ applied to the Seebeck cell and the Seebeck coefficient of the materials used. Hereafter, by convention, a positive gradient $\Delta T > 0$ will lead to the appearance of a positive voltage $V > 0$ and a negative gradient $\Delta T < 0$ will lead to the appearance of a negative voltage $V < 0$.

Figure 8:
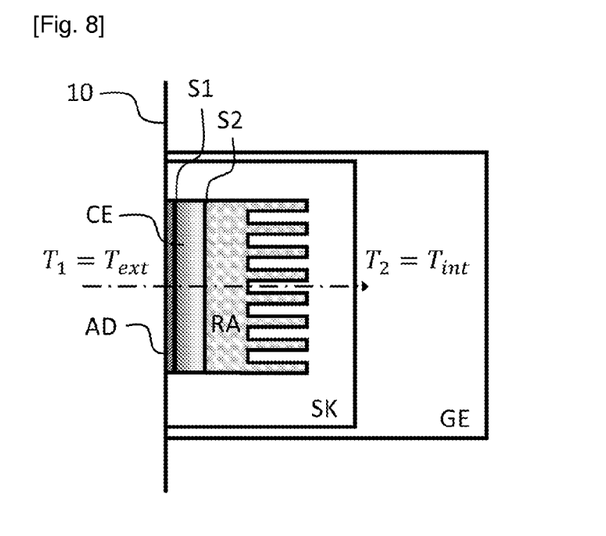
FIG. 8 shows a schematic representation of a first exemplary embodiment of a Seebeck module of a device according to a first aspect of the invention.

An exemplary embodiment is illustrated in FIG. 8 wherein the Seebeck module SK is fixed on the inner surface SI of a wall 10, for example the fuselage of an airplane, so as to benefit from the temperature difference between an internal temperature $T_{int}$ and an external temperature $T_{ext}$. For example, in the case of an aircraft, a substantial temperature difference exists during flight phases or instead during storage phases in conditions of high external temperatures. More particularly, the Seebeck module SK comprises a Seebeck cell CE comprising a first surface S1 and a second surface S2 as well as a radiator RA fixed on the second surface S2 of the Seebeck cell. In addition, the radiator RA comprises fins enabling efficient thermalisation of the second surface S2 of the Seebeck cell CE. In this example, the first surface S1 of the Seebeck cell is fixed at the level of the inner surface SI of a wall 10, for example the inner surface of the fuselage of an aircraft. This fixation is preferentially done using an adhesive AD which is a good heat conductor so as to ensure good thermalisation of the first surface S1 of the Seebeck cell in contact with the inner surface of the wall 10. In this configuration, the temperature gradient ΔT applied to the Seebeck module SK is thus equal to the difference between the temperature $T_2$ of the second face S2 of the Seebeck cell and the temperature $T_1$ of the first face S1 of the Seebeck cell. For example, if the wall 10 is the fuselage of an aircraft, during the flight phase, the temperature $T_1$ of the first surface is generally comprised between −20° C. and −30° C., or even in extreme cases −50° C. to −60° C., whereas the temperature $T_2$ of the second surface is in general equal to 0° C. due to the presence of the radiator. Thus, during the flight phase, the temperature gradient ΔT applied to the Seebeck module SK is thus generally comprised between 20° C. and 60° C. Given these temperature ranges and a power requirement of the order of several tens of mW, a Seebeck cell of several tens of millimetres, for example 40×40 mm, may be sufficient. As an example, the table below illustrates the charging times of a storage means MS (the left column representing the capacitance of the storage means in Farads noted C(F)) as a function of time and the temperature gradient ΔT applied to a Seebeck module SK.

TABLE 1

| | ΔT (° C.) | | | | | | | |
|---|---|---|---|---|---|---|---|---|
| C (F) | 5 | 10 | 15 | 20 | 25 | 30 | 40 | 50 |
| 0.5 | 31 min | 7 min | 3 min | 104 s | 64 s | 43 s | 22 s | 13 s |
| 1 | 62 min | 15 min | 6 min | 3 min | 2 min | 85 s | 44 s | 26 s |
| 2 | 125 min | 30 min | 13 min | 7 min | 4 min | 3 min | 89 s | 52 s |
| 3 | 187 min | 45 min | 19 min | 10 min | 6 min | 4 min | 2 min | 78 s |

Figure 9:
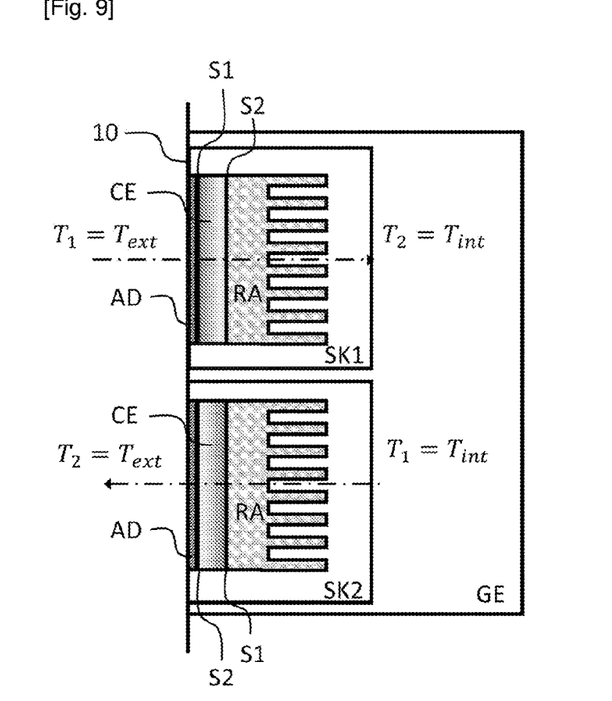
FIG. 9 shows a schematic representation of a first exemplary embodiment of a set of two Seebeck modules of a device according to a first aspect of the invention.

In one embodiment illustrated in FIG. 9, the autonomous electrical energy generation means GE comprise a second Seebeck module SK2 configured in an inverse manner compared to the Seebeck module SK1 described previously, hereafter first Seebeck module SK1. In other words, given that a Seebeck cell comprises a first surface S1 and a second surface S2, when the device 3 according to a first aspect of the invention is fixed to a surface, the Seebeck cell CE of the first Seebeck module SK1 is in contact with this surface through its first surface whereas the Seebeck cell CE of the second Seebeck module SK2 is in contact with said surface through its second surface. In other words, in the example illustrated in FIG. 9 and for the second Seebeck module SK2, the radiator RA is fixed on the first surface S1 of the Seebeck cell CE and the second surface S2 of the Seebeck cell CE is fixed at the level of the inner surface of the wall 10. In this embodiment, the autonomous electrical energy generation means GE are thus able to provide a positive (or negative) voltage whatever the sign of the temperature gradient ΔT between the internal temperature $T_{int}$ and the external temperature $T_{ext}$. In FIG. 9, the dashed arrow indicates, for each Seebeck module SK1,SK2, the sense of the temperature gradient required to obtain a positive voltage V at the terminals of the considered Seebeck module SK1,SK2.

In one embodiment, the autonomous electrical energy generation means GE comprise a piezoelectric module, said piezoelectric module being configured to generate a voltage when it is subjected to vibrations of the surface on which it is fixed. In one embodiment, the autonomous electrical energy generation means GE comprise a piezoelectric module and a Seebeck module SK. This solution has the advantage of combining several electrical energy sources and makes it possible to ensure an optimal autonomy of the device 3 according to a first aspect of the invention.

A second aspect of the invention relates to a system for detecting impacts on a structure, the detection system comprising a plurality of detection devices 3 according to a first aspect of the invention positioned on a surface SI of the structure, each detection device 3 being associated with an identifier relating to a predetermined zone of the structure; and a plurality of communication devices close to the structure and configured to communicate with the detection devices 3 of the plurality of detection devices 3 so as to collect the measurements made by said devices 3 and to associate them with the identifier of the corresponding device 3. In one embodiment, the plurality of communication devices are configured to send an instruction to the detection devices 3 of the plurality of detection device 3 to adopt a mode among the autonomous mode, the transition mode or the RF mode.

In the remainder of the description, the system according to a second aspect of the invention is going to be illustrated through an application in which the structure to monitor is the fuselage of an aircraft 1. Those skilled in the art will understand that such a system may be used in other situations. The fact remains however that the system according to a second aspect of the invention is particularly suited to the monitoring of impacts on an aircraft fuselage. Indeed the use of different operating modes is particularly well suited to the different phases observed by an aircraft 1 while in use (flight phase, ground phase or instead storage phase). Consequently, a third aspect of the invention illustrated in FIG. 10 relates to an aircraft 1 comprising a fuselage 10 and an impact detection system according to a second aspect of the invention. The detection system comprises a plurality of detection devices 3 according to a first aspect of the invention positioned on an inner surface SI of the fuselage 10 of the aircraft 1. Further, each detection device 3 is associated with an identifier relating to a predetermined fuselage zone 10, such that it is possible, knowing the identifier of the device having detected an impact, to know the zone in which the impact has occurred.

Figure 10:
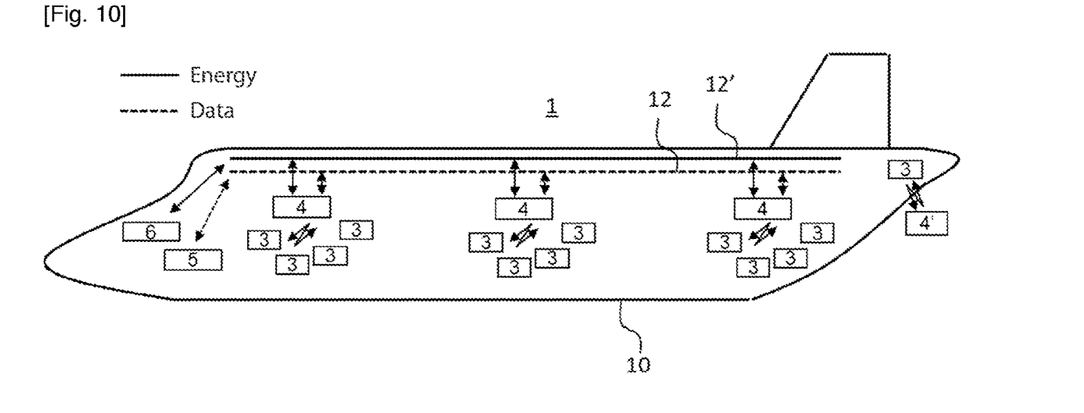
FIG. 10 shows a schematic representation of an aircraft equipped with a detection system according to a second aspect of the invention.

In one embodiment, the detection devices 3 are fixed on the inner surface SI of the fuselage 10 using an adhesive. The use of an adhesive enables an easy positioning and repositioning of the detection devices 3. In addition, such a fixing means reduce the risks of damaging the fuselage 10 during the fixation of said detection devices 3.

The aircraft 1 according to a third aspect of the invention also comprises a plurality of communication devices 4 arranged in the aircraft 1 and configured to communicate with the detection devices 3 of the plurality of detection devices 3 so as to collect the measurements made by said devices 3 and to associate them with the identifier of the corresponding device 3. Preferably, the plurality of communication devices 4 are positioned so as to be able to communicate with all of the detection devices 3 of the plurality of detection devices 3. It is important to note that a communication device 4 will be able to communicate with one or more detection devices 3. It is also important to note that one or more detection devices 3 may be positioned so as not to be able to communicate with any of the communication devices 4. The latter will however be able to be interrogated using a portable communication device 4', for example during control or maintenance operations.

In one embodiment, the communication devices 4 of the plurality of communication devices 4 are also configured to give an instruction to the detection devices 3 of the plurality of detection device 3 to adopt an operating mode among the autonomous mode, the transition mode or the external mode. The corresponding instruction will be able to result from a selection by a user of the desired operating mode or instead result from an instruction generated automatically as a function of the situation of the aircraft 1.

In an alternative embodiment, each detection device 3 of the plurality of detection devices 3 adopts its operating mode autonomously, for example as a function of the available energy sources.

In one embodiment, the communication devices 4 are supplied by an electrical supply network 12' connecting the different communication devices 4 to the electrical supply 6 of the aircraft 1. The energy thus received may next be transmitted to each detection device 3 through the means for receiving energy by radio frequency RF, the devices then being in external mode. To do so, each communication device 4 comprises a wireless communication means MC'/RF' configured to operate as wireless communication means or as means for sending energy by radio frequency to the detection devices 3. Assuming a communication device 4 having an antenna AN' of gain equal to 3 dBi and a loss due to the cable of 4.4 dB, and a detection device 3 having an antenna AN having a gain equal to 4.5 dBi, table 2 below illustrates the power transmitted (in dBm and in W) and the power received at the level of a detection device 3 (in dBm and in mW) as a function of the distance separating the considered communication device 4 from the considered detection device 3.

TABLE 2

| Distance | Power transmitted (dBm) | Power transmitted (W) | Power received (dBm) | Power received (mW) |
| --- | --- | --- | --- | --- |
| 1 m | 33 | 2 | 4.9 | 3.1 |
| 3 m | 33 | 2 | −4.6 | 0.34 |
| 5 m | 33 | 2 | −9.1 | 0.12 |
| 10 m | 33 | 2 | −15.1 | 0.031 |

Those skilled in the art will thus ensure to take this information into account during the positioning of the communication devices 4 and/or the positioning of the detection devices 3, while obviously adapting the hypotheses made above.

Figure 11:
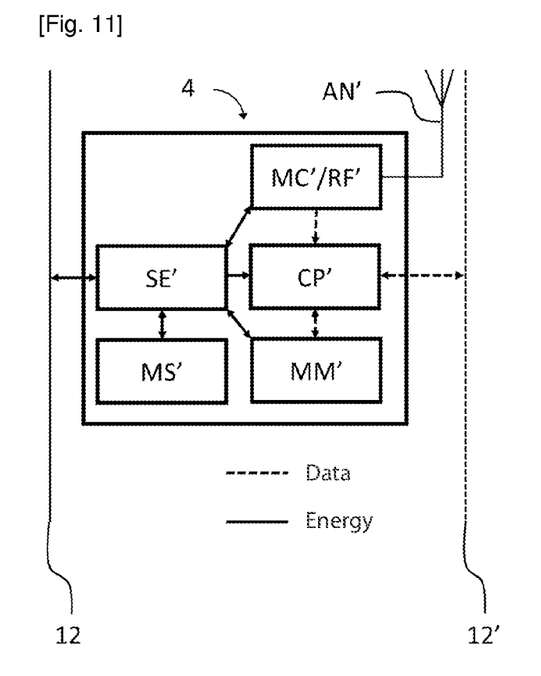
FIG. 11 shows a schematic representation of a communication device of a system according to a second aspect of the invention or of an aircraft according to a third aspect of the invention.

In one embodiment illustrated in FIG. 11, each communication device 4 comprises an energy storage means MS', for example a battery, configured to supply the communication device 4 when the electrical supply network 12' no longer supplies energy. This is notably the case when the aircraft 1 is parked for a long period. Thus, even without external electrical supply, the communication devices 4 of the aircraft 1 may continue to interrogate the detection devices 3, or even to supply the detection devices 3 by radio frequency if necessary. In one embodiment, the communication device 4 also comprises an energy supervisor SE' in charge of the management of the energy of the communication device 4, and in particular the energy storage means MS'.

In the same way, the communication devices 4 are connected to a communication network 12 and the data collected from the detection devices 3 by the communication devices 4 may be transmitted on the communication network 12 to next be processed, for example by an on-board computer 5 or instead by a centralised maintenance server. In one embodiment, each communication device 4 comprises a memory MM' (e.g. a hard disc), the data collected from the detection devices 3 being stored on the memory MM' when the electrical supply network 12' no longer supplies energy, then transmitted on the communication network when the electrical supply network 12' again supplies energy. In one embodiment, the communication device 4 comprises a computing means CP' (for example a processor) making it possible to process the data stored in the memory MM'.

In one embodiment, the fuselage 10 is a composite fuselage. Indeed, composite fuselage damage is particularly difficult to detect by visual inspection and a detection system such as described in the second aspect of the invention makes this detection much more reliable. It follows from the above that the invention may be implemented on any type of fuselage (made of composite materials, metal materials, etc.).

The invention claimed is:

1. An impact detection device comprising an impact detector, a wireless communication device, an energy storage device, an autonomous electrical energy generation device distinct from the impact detector and comprising a piezoelectric module and a Seebeck module, and a system adapted to receive energy by radio frequency, the impact detection device being configured to adopt the following two modes:
   a first autonomous mode, in which the autonomous electrical energy generation device is configured to supply the impact detector and the wireless communication device;
   a second external mode, in which the system adapted to receive energy by radio frequency is configured to supply the impact detector and the wireless communication device,
   wherein the wireless communication device is configured to receive instructions to indicate to the impact detection device the operating mode to adopt among the two modes.

2. The impact detection device according to claim 1, wherein the impact detection device is configured to alternate between the first autonomous mode, the second external mode and a third transition mode, in which the energy storage device is configured to supply, without external energy input, the impact detector and the wireless communication device, the first autonomous, the second external and the third transition modes being mutually exclusive.

3. The impact detection device according to claim 2, wherein when the impact detection device is in the second external mode, the system adapted to receive energy by radio frequency is configured to supply the impact detector and the wireless communication device through the energy storage device.

4. The impact detection device according to claim 2, wherein, when the impact detection device is in the first autonomous mode, the autonomous electrical energy generation device is configured to supply the impact detector and the wireless communication device through the energy storage device.

5. The impact detection device according to claim 1, wherein the wireless communication device is configured to operate as the device for receiving energy by radio frequency when the impact detection device is in the second external mode.

6. An impact detection system for detecting impacts on a structure, the detection system comprising:
   a plurality of impact detection devices according to claim 1 positioned on a surface of the structure, each detection device being associated with an identifier relating to a predetermined zone of the structure;
   a plurality of separate communication devices configured to communicate with the impact detection devices of the plurality of detection devices so as to collect measurements made by said impact detection devices and to associate the measurements with the identifier of the corresponding impact detection device.

7. The impact detection system according to claim 6, wherein the plurality of communication devices are configured to send an instruction to the impact detection devices to adopt a mode among the first autonomous mode, a third transition mode, or the second external mode.

8. The impact detection system according to claim 6, wherein each communication device comprises an energy storage device and/or a memory.

9. An aircraft comprising a fuselage and an impact detection system according to claim 6 configured to detect impacts on the fuselage, the impact detection devices of the impact detection system being arranged on an inner surface of the fuselage and the plurality of communication devices of the impact detection system being arranged in the aircraft.

10. The impact detection device according to claim 1, wherein the impact detection device is arranged in an aircraft, wherein, based on the instructions received by the wireless communication device, the impact detection device is (a) in the first autonomous mode when the aircraft is in a flight phase and (b) in the second external mode when the aircraft is in a ground phase.

11. The impact detection device according to claim 10, wherein the first autonomous mode and the second external mode are mutually exclusive.

12. The impact detection device according to claim 11, wherein a transition between the first autonomous mode and the second external mode is initiated automatically based on a signal received by the wireless communication device.

* * * * *